United States Patent
Mazula

(10) Patent No.: US 9,916,398 B2
(45) Date of Patent: Mar. 13, 2018

(54) LASER SCAN RE-ENGINEERING OF 3D CAD MODELS

(71) Applicant: Dassault Systemes, Velizy Villacoublay (FR)

(72) Inventor: Nelia Gloria Mazula, Houston, TX (US)

(73) Assignee: Dassault Systemes, Velizy Villacoublay (FR)

( * ) Notice: Subject to any disclaimer, the term of this patent is extended or adjusted under 35 U.S.C. 154(b) by 418 days.

(21) Appl. No.: 14/101,930

(22) Filed: Dec. 10, 2013

(65) Prior Publication Data

US 2015/0161294 A1    Jun. 11, 2015

(51) Int. Cl.
*G06F 17/50* (2006.01)

(52) U.S. Cl.
CPC .......... *G06F 17/50* (2013.01); *G06F 17/5004* (2013.01); *G06F 2217/02* (2013.01)

(58) Field of Classification Search
CPC ... G06F 17/5004; G06F 2217/02; G06F 17/50
USPC ....................................... 703/2, 1
See application file for complete search history.

(56) References Cited

U.S. PATENT DOCUMENTS

| | | | |
|---|---|---|---|
| 2003/0149498 A1* | 8/2003 | Rebello | G05B 19/4097 700/97 |
| 2005/0168460 A1* | 8/2005 | Razdan | G06F 17/30398 345/419 |

FOREIGN PATENT DOCUMENTS

| | | |
|---|---|---|
| CA | 2872114 A1 | 6/2015 |
| CN | 104699886 A | 6/2015 |
| EP | 2884411 A1 | 6/2015 |
| IN | 3584MU2014 A | 10/2015 |
| JP | 2015115071 A | 6/2015 |
| KR | 20150067721 | 6/2015 |

OTHER PUBLICATIONS

Johnson, Andrew E. et al., "A System for Semi-Automatic Modeling of Complex Environments", 1997, IEEE.*
Son, H. et al., "Knowledge-Based Approach for 3D Reconstruction of As-Built Industrial Plant Models from Laser-Scan Data", Aug. 2013, Proceedings of the 30th ISARC.*
Yue, Kui et al. "The ASDMCon Project: The Challenge of Detecting Defects on Construction Sites", 2006, Proceedings of the Third International Symposium on 3D Data Processing, Visualization, and Transmission, IEEE.*
Durupt, A. et al., "From a 3D Point Cloud to an Engineering CAD Model, A Knowledge Product Based Approach for Reverse Engineering", Jun. 2008, Virtual and Physical Prototyping.*

(Continued)

*Primary Examiner* — Cedric D Johnson
(74) *Attorney, Agent, or Firm* — Hamilton, Brook, Smith & Reynolds, P.C.

(57) ABSTRACT

A 3D CAD model of a plant, a factory, refinery, or facility is re-built from laser scan data of the plant, a factory, refinery, or facility. Through a rules-based analysis, CAD model objects are identified in the laser scan data. The rules map laser scan data to CAD model objects based on shape, size and/or sequence of connection of objects in the plant, a factory, refinery, or facility grouping. Design logic of equipment and process facilities are also utilized by the rules.

17 Claims, 5 Drawing Sheets

(56) References Cited

OTHER PUBLICATIONS

Boochs, Frank et al., "Integration of Knowledge to Support Automatic Object Reconstruction from Images and 3D Data", 2011, 8th International Multi-Conference on Systems, Signals and Devices, IEEE.*
Tang, Pingbo et al., "Automatic Reconstruction of As-Built Building Information Models from Laser-Scanned Point Clouds: A Review of Related Techniques", 2010, Elsevier B.V.*
Ma, Ruijin, "Building Model Reconstruction from LIDAR Data and Aerial Photographs", 2004, The Ohio State University.*
Duan, Yucong et al., "Architectural Reconstruction of 3D Building Objects through Semantic Knowledge Management", 2010, 11th ACIS International Conference on Software Engineering, Artificial Intelligence, Networking and Parallel/Distributed Computing, IEEE Computer Society.*
Mura, Claudio et al., "Robust Reconstruction of Interior Building Structures with Multiple Rooms under Clutter and Occlusions", 2013, 13th International Conference on Computer-Aided Design and Computer Graphics, Conference Publishing Services, IEEE.*
European Search Report, EP 14195723.3, "Laser Scan Re-Engineering of 3D CAD Models", dated Mar. 25, 2015.
Son, et al., "Knowledge-Based Approach for 3D Reconstruction of As-Built Industrial Plant Models From Laser-Scan Data", *2013 Proc. of the 30th Int'l Symposium on Automation and Robotics in Construction*, Montreal, Canada, pp. 885-893 (Aug. 11, 2013).
Tang, et al., "Automatic reconstruction of as-built building information models from laser-scanned point clouds: A review of related techniques", *Automation in Construction*, pp. 829-843 (Nov. 1, 2010).

* cited by examiner

LASER SCAN RE-ENGINEERING OF 3D CAD MODELS

BACKGROUND OF THE INVENTION

Computer-aided techniques are known to include Computer-Aided Design or CAD, which relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing processes and operations.

A number of systems and programs are offered on the market for the design of objects (or parts) or assemblies of objects, forming a product, such as the one provided by Dassault Systèmes under the trademark CATIA. These CAD systems allow a user to construct and manipulate complex three dimensional or 3D models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are mostly specifications of geometry. Specifically, CAD files contain specifications, from which geometry is generated, which in turn allow for a representation to be generated. Geometry and representation may be stored in a single CAD file or multiple ones. CAD systems include graphic tools for representing the modeled objects to the designers; these tools are dedicated to the display of complex objects; the typical size of a file representing an object in a CAD system being in the range of one Megabyte per part, and an assembly may comprise thousands of parts. A CAD system manages models of objects, which are stored in electronic files.

The current process facility asset (i.e., plants, production facilities, refineries, etc.) is complex and continuously changing due to plant modifications. Often, since the plant is very large, the minor modification are done in lower cost 2D CAD which is not compatible with the 3D CAD application that was used to originally design the plant or in a different 3D CAD application from the originating 3D CAD application type. After many changes to the facility, the originating 3D CAD model is rendered obsolete. As a result, for major modifications and expansions, companies are forced to have a laser scan of the facility to get an as-is view of the plant. The laser scan however is not a CAD application and additional services and costs are required to re-engineer the areas of interest to convert the laser scan format (i.e. point clouds) to a 3D CAD format.

Current technologies involve a lot of manual conversions combined with a catalog of existing 3D model (or image) parts that can be brought into the laser scan.

SUMMARY OF THE INVENTION

The present invention provides an automated technology to map from laser scan data (of a facility) and to generate corresponding CAD model objects as a function of shape, size and sequence of connection of objects in the facility. Embodiments accelerate the time to have (rebuild) a 3D CAD model of the facility from laser scan data. This can also save time by reducing the amount of labor required to accomplish the same task.

In one embodiment, a computer-implemented method of 3D Computer Aided Design (CAD) modeling comprises:

receiving laser scan data of a subject facility, the subject facility having various equipment, and there being a previously generated 3D CAD model of the subject facility;

applying a computer automated analysis to the received laser scan data to rebuild the 3D CAD model of the subject facility, the analysis utilizing design logic of the facility and design logic of equipment; and providing on output the rebuilt 3D CAD model of the subject facility. The method providing output includes displaying the rebuilt 3D CAD model to a user.

In embodiments, the analysis is rules-based. The analysis maps laser scan data to CAD model objects forming the previously generated 3D CAD model. Different CAD model objects represent different objects and equipment in the facility. The analysis mapping may be based on shape, size and sequence of connection of objects and equipment in the facility.

The analysis may identify in the laser scan data a shape defined in a graphical object database. The database maps the shape to a CAD modeling primitive. In embodiments, the analysis further adds a new shape to the graphical object database.

In various embodiments, the subject facility is any of a plant, a factory or a refinery. In other embodiments, the method is applied to laser scan or similar data of cities, supply chains, other entities and multi-asset groupings.

Embodiments may be a computer program product, computer apparatus and/or computer system implementing the foregoing CAD modeling and CAD model rebuilding (re-engineering).

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Embodiments employ a laser scanning re-engineering logic and approach that is similar to a laser scan optical character recognition (OCR) technology. Embodiments utilize logic that is similar in concept to reassembling a broken jar by gluing the pieces back together. Using this approach, embodiments automatically create CAD model objects and desired 3D CAD models from the laser scan data.

Figure 1:
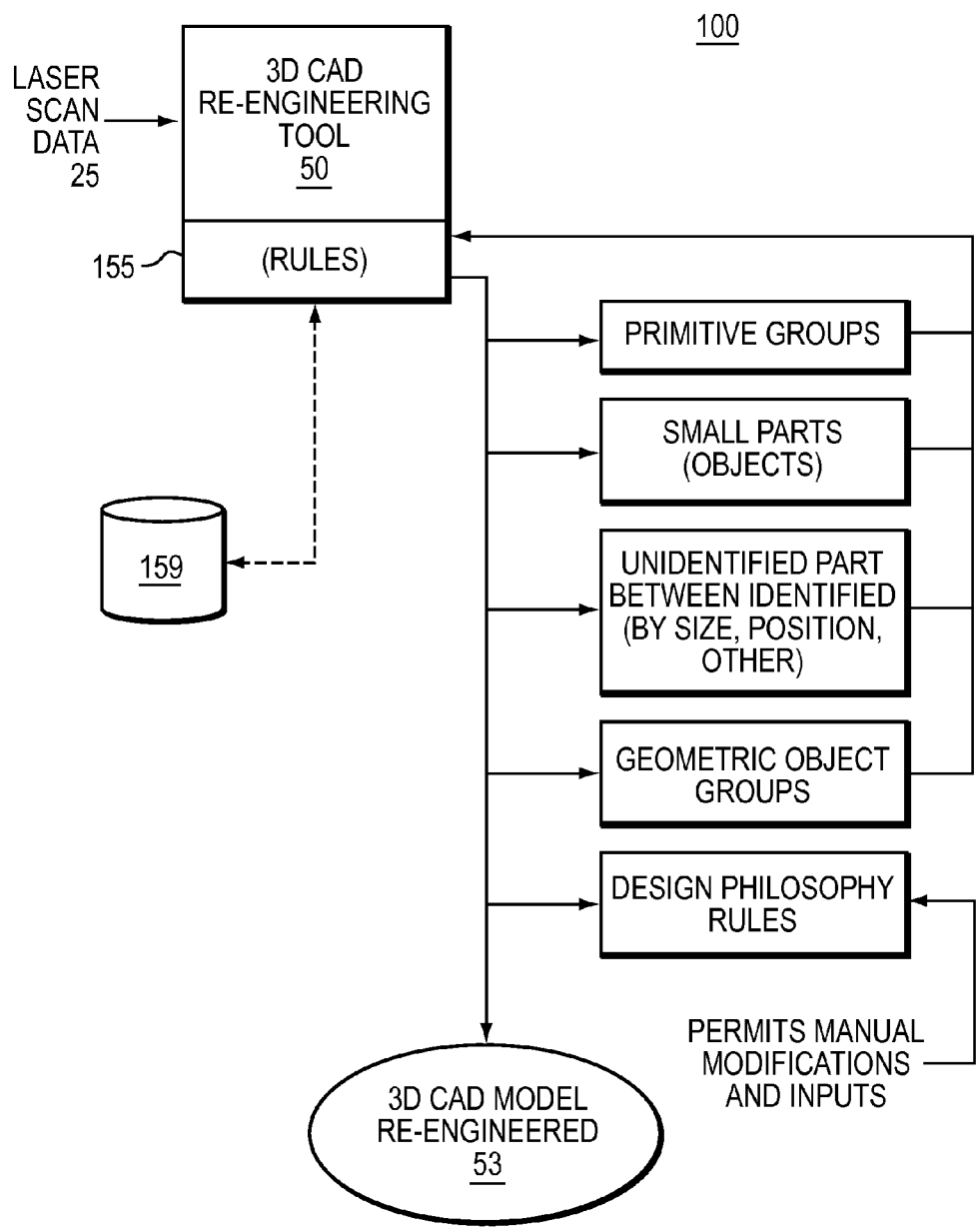
FIG. 1 is a schematic view of embodiments of the present invention.

Illustrated in FIG. 1 is a non-limiting example embodiment 100 of the present invention. A 3D CAD re-engineering tool 50 receives as input laser scan data 25. In the given example, the input laser scan data 25 includes laser scan images of a subject facility (plant, refinery, factory and the like). The subject facility is formed of multiple objects. A previously generated 3D CAD model of the facility thus has corresponding 3D CAD models of the facility objects. The tool 50 analyzes the received laser scan data 25 toward identifying and determining facility objects to be represented by respective re-engineered 3D CAD model 53. To accomplish this, tool 50 preferably employs the following algorithm or analyzer 155. In embodiments, the algorithm is rules-based.

Embodiments of the approach/algorithm iteratively attempt to automatically identify shapes in the laser scan data 25 and attach graphical primitives (of CAD modeling applications) to the laser scan parts/areas until an identifiable shape is created. An "identifiable shape" is defined using known process facilities design logic especially for productions process assets, refineries and chemical plants. These shapes can be mapped to an existing graphical object database 159 of CAD model primitives or they can become new objects in the databases 159 for future use. Thus, this algorithm (analyzer 155) allows one to leverage design logic of equipment and process facilities to automatically re-engineer 3D CAD models 53 from laser scanned formats.

The automated rules further facilitate knowledge capture for use in future re-engineering projects and new 3D CAD design projects that may also leverage the rules generated from this technology. In summary the inputs or algorithms used to identify objects may also in some cases capture design rules and practical implementation of designed objects sometimes not updated in the design rules. For example an existing design rule in an organization may be that all pressurized major equipment should be surrounded by a double block and bleed configuration of valves, which means at least 2 valves separated by a pipe segment, and contained by a drain also closed off by a valve. However in practice some equipment innovations may result in the use of a single equipment that is mechanically different in configuration but meets the design logic requirement and is considered for only certain instances like lower pressure equipment. The current art methods would capture the update to the design logic as an annotation or worse even not have any official mechanism to capture this logic at all. Using the present invention technology, the tool 50 notices the object in place is different and allows the analyzer system 155 to generate an exception rule. This also enables the domain expert (i.e. design engineer) to input the design logic and subsequently capture the knowledge systematically.

In other embodiments, analyzer 155 is a working module, operative member, analysis engine, computer executable component(s), digital processor process, or the like (generally referenced as 155).

The first run of the algorithm (at 155) looks for obvious objects (to be represented by respective 3D CAD model 53 objects) from primitive groups, such as pipe segments, drums, pumps, pipe parts, vessels, valves, filters towers, buildings, gauges, doors, gates/fences, pillar structures, staircases, handrails, etc. Another run (at 155) looks for small object parts that can be removed from the search such as grommets, screw tops, bolts, ridges on a flat surface and so on. After removing unnecessary shapes and effectively smoothing out the 3D CAD model 53, a third loop of analyzer 155 searches again for obvious object groups. After each loop, objects that have been identified for the subject re-engineered CAD model 53 are highlighted and deactivated in the laser scan environment for more efficient future runs/loops by analyzer 155.

The next run of analyzer 155 looks for unidentified object parts such as handles, latches, instrument parts (i.e., pressure indicator metal structure). To distinguish these from unidentifiable objects that will remain, the subject objects contain a continuous unidentified part attached on both ends to identified object parts (e.g., a pipe segment attached to an unidentified object attached to an identified valve). In this scenario, the graphic in the middle of these two objects is filtered out for additional processing. Additional processing (by analyzer 155) of the subject objects (candidates for CAD model 53) involves first separating objects by size and then adding more complex logic based on position and other identifying variables. Detailed later below are rules in some embodiments.

In the last iteration, analyzer 155 identifies simple geometrical objects (candidates for CAD model 53) such as cylinders, cones, spheres, cubes and the like. The objects groupings with geometrical objects can then be processed (at 155) through additional rules based on the shape, position and geometrical object contained in the grouping.

Finally for the remaining objects, analyzer 155 runs through a set of rules based on plant design philosophies. For example, a pump configuration design philosophy may apply the following rules.

This pump design philosophy requires that high pressure pumps are required to follow isolation rules such that the pump is both preceded by and followed by a double in pipe valve on either side of a smaller drain valve. For such a pump design, tool 50 analyses/algorithm at 155 identifying the pump and 3 of these valves can identify the unidentified remaining CAD model objects by assuming that the remaining objects are 3 additional unidentified groupings separated by pipe segments and elbows.

In other embodiments, the tool 50/analyses engine 155 may allow the user to simply select from 3D CAD model 53 an object/tag and state that it is incorrectly mapped. The tool 50/analysis engine 155 may also allow the user to input to CAD model 53 the correct object information. The tool 50/analysis engine 155 may capture ratio of size of any simple geometric objects in the CAD model 53 and ratio comparisons between the object, its proceeding object and succeeding object to generate a possible rule.

Rules can also be automatically added in some embodiments.

Exemplification

The following presents sample logic rules used by analyzer 155 (in one embodiment) to generate logic loops in java or other similar code in a laser scan.

1. Possible valve—The object length l (in laser scan data 25) is less than twice (2 times) the object's height h, and the object's width is equal to the objects on either side of it, and the objects on either side of the object are nozzles, and the base of the object contains a spherical sector less than a hemisphere.

As shown in FIGS. 2a-2d, sample equations for this are:

$$V(l) < 2 \times h,$$

$$V(w) = Noz(w),$$

$$SSv(h) \neq SSv(r)$$

where h is the height of the spherical sector and r is the radius.

Where Noz(w) is the adjoining nozzles' width, and SSv (h) is the valve's spherical sector's height, and SSv(r)) is the valve's spherical sectors radius where the spherical sector describes the spherical cap at the base of the valve and where the base of the valve is always facing in such a way that the peak of the sphere is point down (toward the Earth).

2. Possible valve grouped with nozzles—The object length L (in laser scan data 25) is less than 2 times the object height H, and the object width W is less than 1.5 times larger than the objects on either side and the objects on either side are pipes without nozzles.

Figure 2A:
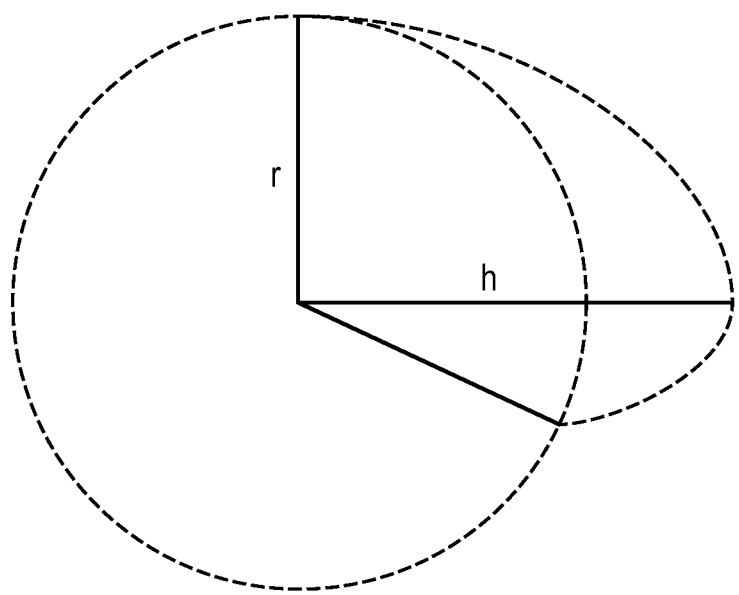
FIGS. 2a-2d are schematic illustrations of processing logic in embodiments.
Figure 2B:
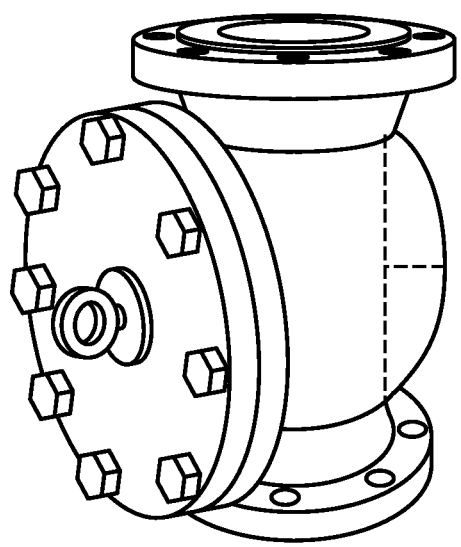
Figure 2C:
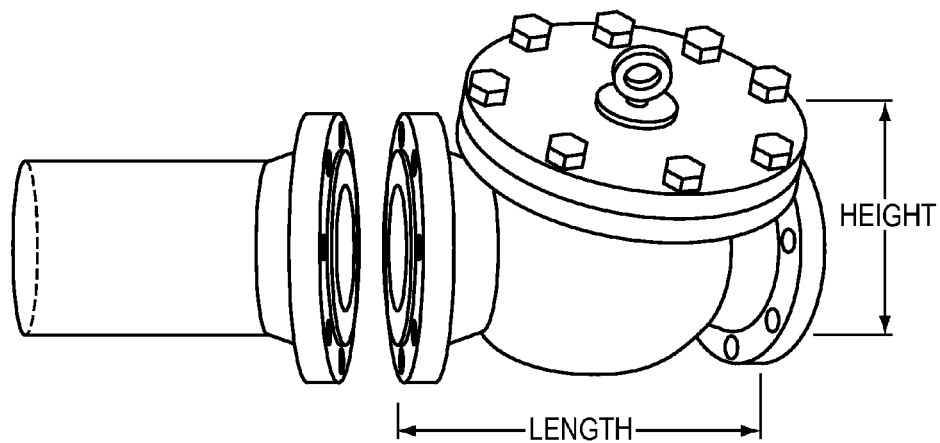
Figure 2D:
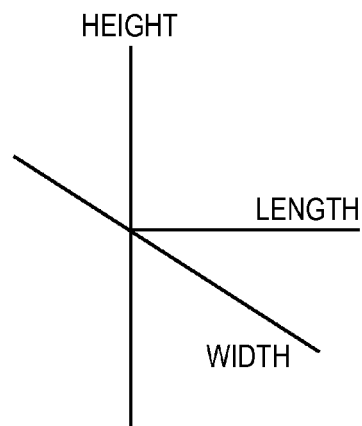

$L<2\times H,$ $W<1.5N(\text{diam}):$ where N(diam)=adjoining nozzle diameter, as illustrated in FIGS. 2c-2d.

3. Possible flow element—The object length (in laser scan data 25) is less than 1.5 times the object height, and the object height is between 1.5 and 1 times the object width, and the object contains no spherical sectors, and the object width and height are between 1.5 and 1 times the size of the corresponding object dimensions on either side of the object, and the objects on either side are either a nozzle or a pipe. If the object is not a nozzle then this is possibly a flow element grouped with pipe nozzles.

4. Possible in-pipe filter—The object length (in laser scan data 25) is less than 2 times the object height, and the object shape contains a tilted cylindrical object, and the objects before and after the object are pipes or nozzles, and the angle of the pipe segment objects before and after the cylinder are different than the cylinder object such that the cylindrical object is at a tilt (cylinder is at an angle different than adjoining pipe segments).

a) Also identified by two circular geometries in a grouping separated by a distance less than 2 feet at the same angle on a plane which is a different angle than the pipe segments just before and just after the object grouping.

5. Possible boot drum—the object grouping contains three hemispheres and two cylinders, and the cylinders are perpendicular to each other, and two of the hemispheres are larger in size than the third, and the third hemisphere is perpendicular to the other two hemispheres.

6. Possible elbow—the objects before the grouping are pipe segments of equal diameter and the pipe segment before the object grouping is perpendicular to the pipe segment after the object grouping.

7. Possible vessel—The object grouping contains no more than two hemispheres, one hemisphere with the spherical top facing up and the other hemisphere with the spherical top facing down toward the ground, and a cylindrical object connects the two spheres.

Further there may be logical rules to filter and identify object groupings.

In other embodiments, the rules/analysis engine 155 can be imbedded in a laser scan viewer in a 3D CAD modeling system to automatically populate the 3D CAD model 53 from the laser scan data 25. Thereafter the rebuilt 3D CAD model 53 is displayed to a user on a display monitor, saved in computer memory, made accessible to CAD modeling applications and so forth.

According to the foregoing, equipment and process engineering design rules and CAD modeling primitives can be used to re-engineer 3D CAD models 53 from laser scan graphics. Using the CAD modeling primitives to re-engineer a 3D CAD model (in a manner like re-building a broken jar from its pieces) is heretofore unachieved, and combining laser scan equipment with process design is unique.

Figure 3:
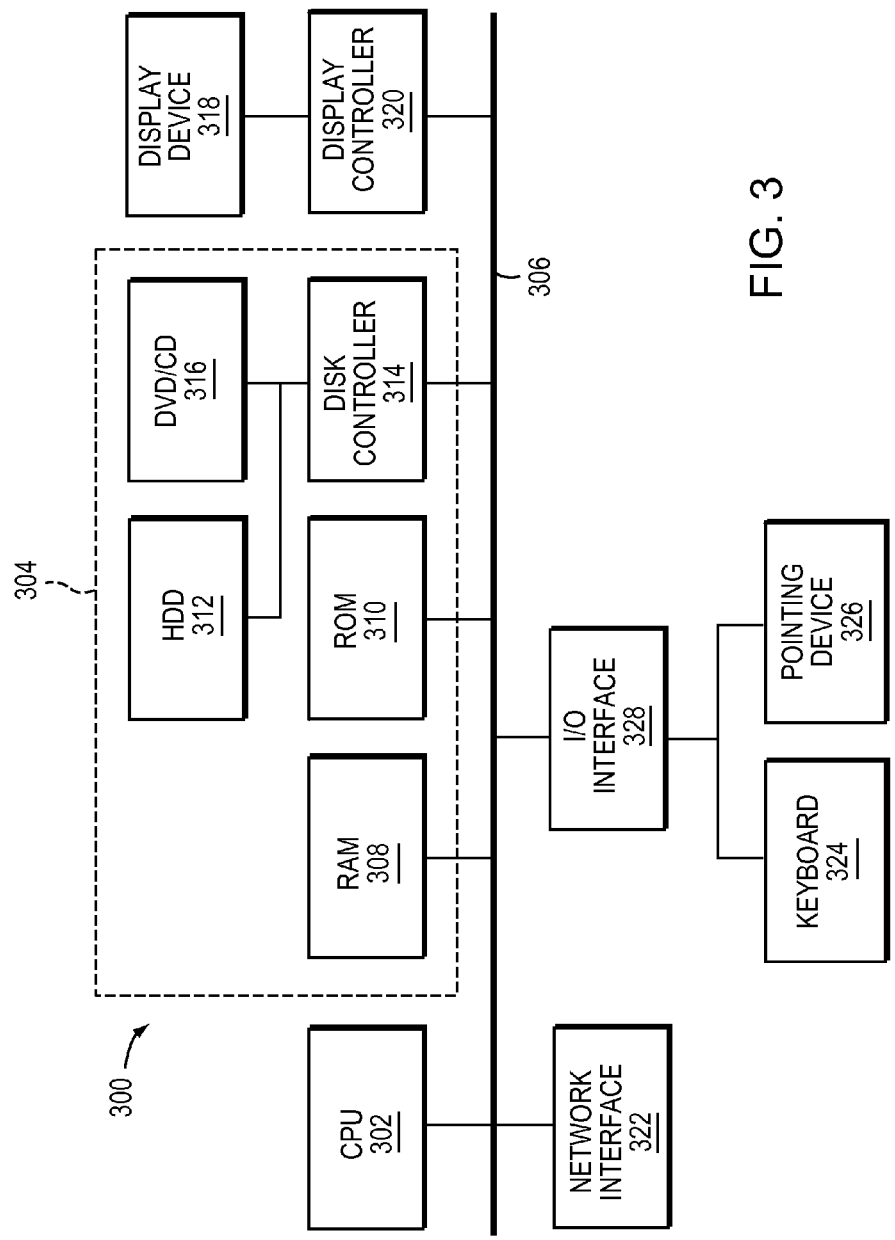
FIG. 3 is a block diagram of a computer system embodying the present invention.

FIG. 3 is a schematic block diagram of an exemplary computer-aided design station 300, which may also be referred to herein as a computer system. As used herein, the terms "computer-aided design station" and "computer system" refer generally to any suitable computing device that may be used to perform the processes described above and/or any additional processes that may be related to those described above.

In an exemplary embodiment, the computer-aided design station 300 includes one or more processors 302 (CPU) that performs the processes described above and/or any additional processes that may be related to those described above. It should be understood that the term "processor" refers generally to any programmable system including systems and microcontrollers, reduced instruction set circuits (RISC), application-specific integrated circuits (ASIC), programmable logic circuits, and/or any other circuit or processor capable of executing the functions described herein. The above examples are exemplary only and, thus, are not intended to limit in any way the definition and/or meaning of the term "processor."

The steps of the processes described above in FIGS. 1-2d and/or any additional processes that may be related to those described above may be stored as computer-executable instructions in, for example, a non-transitory computer readable medium, such as a memory area 304 that is operably and/or communicatively coupled to the processor 302 by a system bus 306. A "memory area," as used herein, refers generally to any means of storing program code and instructions executable by one or more processors to aid in automatically analyzing laser scan or similar data using CAD re-engineering tool. The memory area 304 may include one, or more than one, forms of memory. For example, the memory area 304 may include random-access memory (RAM) 308, which can include non-volatile RAM, magnetic RAM, ferroelectric RAM, and/or other forms of RAM. The memory area 304 may also include read-only memory (ROM) 310 and/or flash memory and/or electrically-programmable read-only memory (EEPROM). Any other suitable magnetic, optical, and/or semiconductor memory, such as a hard-disk drive (HDD) 312, by itself or in combination with other forms of memory, may be included in the memory area 304. HDD 312 may also be coupled to a disk controller 314 for use in transmitting and receiving messages to and from processor 302. Moreover, the memory area 304 may also be, or may include, a detachable or removable memory 316, such as a suitable cartridge disk, CD-ROM, DVD, or USB memory. The above examples are exemplary only and, thus, are not intended to limit in any way the definition and/or meaning of the term "memory area."

The computer-aided design station 300 also includes a display device 318 that is coupled, such as operably coupled, to a display controller 320. The display controller 320 receives data via the system bus 306 for display by the display device 318. The display device 318 may be, without limitation, a monitor, a television display, a plasma display, a liquid crystal display (LCD), a display based on light-emitting diodes (LED), a display based on organic LEDs (OLED), a display based on polymer LEDs, a display based on surface-conduction electron emitters, a display including a projected and/or reflected image, or any other suitable electronic device or display mechanism. Moreover, the display device 318 may include a touchscreen with an associated touchscreen controller. The above examples are exemplary only and, thus, are not intended to limit in any way the definition and/or meaning of the term "display device."

In addition, the computer-aided design station 300 includes a network interface 322 for use in communicating with a network (not shown in FIG. 3). Moreover, the computer-aided design station 300 includes one or more input devices, such as a keyboard 324 and/or a pointing device 326, such as a roller ball, mouse, touchpad, and the like. The input devices are coupled to and controlled by an input/output (I/O) interface 328, which is further coupled to the system bus 306.

A description of the general features and functionality of the display device 318, keyboard 324, pointing device 326, as well as the display controller 320, disk controller 314, network interface 322, and I/O interface 328 is omitted herein for brevity as these features are known.

Figure 4:
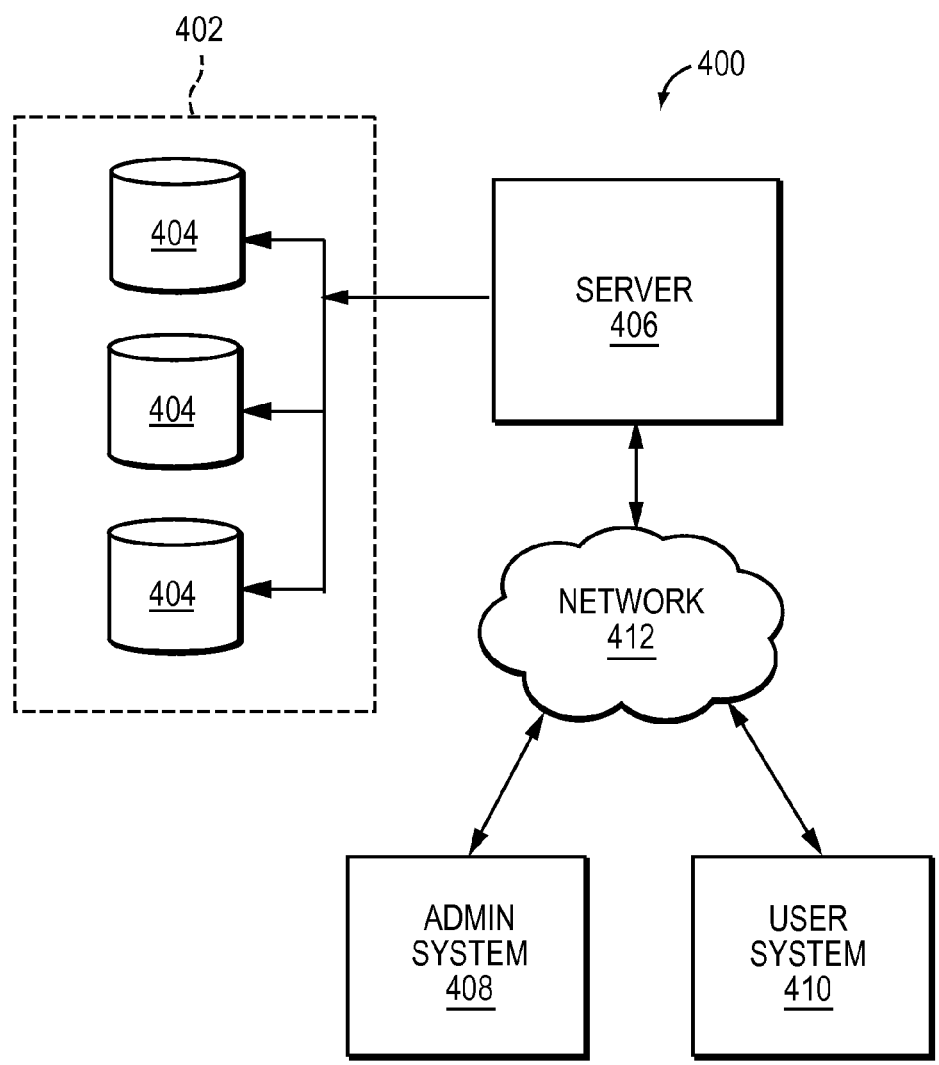
FIG. 4 is a schematic view of a computer network employing the computer system of FIG. 3.

FIG. 4 is a schematic block diagram of an exemplary system 400 for use in re-engineered computer-aided design of a modeled object, such as the processes described above and/or additional processes that may be related to those described above. In an exemplary embodiment, a memory area 402 includes one or more storage devices 404 for use in storing CAD modeling data, such as modeled object data (of objects and equipment of a subject facility), CAD modeling primitives, and/or graphical object data related to CAD modeling primitives. Prior generated 3D CAD models of facilities may be stored in memory area 402 as well as re-built 3D CAD models 53. In some embodiments, the memory area 402 is coupled to a server 406, which is in turn coupled to an administrator system 408 and/or a user system 410 via a network 412. The storage devices 404 may be embodied as one or more databases, may be located at a single or at multiple geographical sites, or may be integrated with the server 406.

As can be appreciated, the network 412 can be a public network, such as the Internet, or a private network such as an LAN or WAN network, or any combination thereof and can also include PSTN or ISDN sub-networks. The network 412 can also be wired, such as an Ethernet network, or can be wireless such as a cellular network including EDGE, 3G and 4G wireless cellular systems. The wireless network can also be WiFi, Bluetooth, or any other wireless form of communication that is known. Thus, the network 412 is merely exemplary and in no way limits the scope of the present advancements.

As one of ordinary skill in the art would recognize, the administrator system 408 and/or the user system 410 can be a computer-aided design station such as the one described above with reference to FIG. 3, or any other computing system that is known. Moreover, it should be understood that the administrator system 408 and/or the user system 410 are configured to perform the processes described above and/or any additional processes that may be related to those described above.

The server 406 stores the computer-readable instructions to execute the processes described above and provides these instructions via the network 412 to the administrator system 408 and/or the user system 410. Moreover, the server 406 can also provide data from the memory area 402 as needed to the administrator system 408 and the user system 410. As such, FIG. 4 includes implementations of the system 400 via cloud computing, distributed computing and the like.

Exemplary embodiments of systems, methods, apparatus, computer program products, and computer-readable storage media for use in computer-aided design of a modeled object are described above in detail. The systems, methods, apparatus, computer program products, and computer-readable storage media are not limited to the specific embodiments described herein but, rather, operations of the methods, program products and/or storage media, as well as components of the system and/or apparatus, may be utilized independently and separately from other operations and/or components described herein. Further, the described operations and/or components may also be defined in, or used in combination with, other systems, methods, apparatus, program products and/or storage media, and are not limited to practice with only the systems, methods, apparatus, program products and storage media as described herein.

A computer or computer system, such as those described herein, includes at least one processor or processing unit and a system memory. The computer or computer system typically has at least some form of non-transitory computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Exemplary computer-executable components for use in the processes described above include, but are not limited to only including, an input component that causes the processor 302 (shown in FIG. 3) to receive a laser scan image 25 of a subject facility having 3D CAD modeled objects. The components also include an interface component that causes the processor 302 to receive user inputs via, for example, the I/O interface 328 (shown in FIG. 3). As described above, the user inputs may be related to user selection of a modeled object in re-engineered 3D CAD model 53, indicating incorrect mapping to the modeled object, and/or to user input of correct object information to 3D CAD model 53 with respect to and/or along with 3D CAD model re-engineering tool 50 and analysis Engine 155.

Moreover, the components include a model re-engineering analyzer component that causes the processor 302 to receive as input laser scan data 25 of a subject facility, analyze the received laser scan data using CAD design logic of the subject facility and CAD design logic of equipment, and automatically re-build the 3D CAD model 53 of the subject facility. In embodiments, the model re-engineering analyzer component also causes the processor 302 to map laser scan data 25 to CAD model objects forming the 3D CAD model 53, different CAD model objects representing different objects and equipment in the facility. The component causes the processor 302 to make such mappings based on shape, size, and sequence of connection of facility objects and equipment in the facility. Moreover, in some embodiments, model-re-engineering analyzer component causes the processor 302 to identify in the laser scan data 25 a shape defined in a graphical object database 159, the database 159 mapping the shape to a CAD modeling primitive. The component may cause processor 302 to add a new shape to the graphical object database 159.

Furthermore, in some embodiments, the model re-engineering analyzer component causes the processor 302 to apply rules to iteratively look for, identify and map from the laser scan data 25:

objects (e.g., pipe segments, drums, pipe parts, pumps, vessels, valves, filter towers, buildings, gauges, doors, gates/ fences, pillar structures, staircases, handrails, etc.) to be represented by respective 3D CAD model 53 objects, small object parts (e.g., grommets, screw tags, bolts, ridges on a flat surface, etc.), unidentified object parts, each being attached on both ends to identified object parts, and geometrical objects (e.g., cylinders, cones, spheres, cubes, etc.).

In addition, in some embodiments, the model re-engineering analyzer component causes the processor 302 to apply a set of rules based on plant design philosophy. The subject facility may be a plant, a factory, or a refinery or other processing plant.

A display component causes processor 302 to display through display devices 318 the re-engineered (re-built) 3D CAD models 53 produced by the present invention tool 50. Such display and subsequent manipulation of the re-engineered 3D CAD model 53 of a subject facility, may be via a 3D CAD modeling application.

Although the present invention is described in connection with an exemplary computer system environment, embodiments of the invention are operational with numerous other general purpose or special purpose computer system environments or configurations. The computer system environment is not intended to suggest any limitation as to the scope of use or functionality of any aspect of the invention. Moreover, the computer system environment should not be interpreted as having any dependency or requirement relating to any one or combination of components illustrated in the exemplary operating environment. Examples of well-known computer systems, environments, and/or configurations that may be suitable for use with aspects of the invention include, but are not limited to, personal computers, server computers, hand-held or laptop devices, multi-processor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

For example, although the foregoing describes application of embodiments to production process assets, the principles of the present invention applies to cities, supply chains, other entities and multi-asset groupings.

What is claimed is:

1. A computer-implemented method of 3D Computer Aided Design (CAD) modeling comprising:
    receiving laser scan data of various equipment within a subject facility, the various equipment having a use associated with the subject facility, there being a prior generated 3D CAD model of the subject facility;
    applying a computer automated analysis to the received laser scan data to rebuild the 3D CAD model of the subject facility, the computer automated analysis utilizing design logic of the subject facility and design logic of the equipment of the subject facility, wherein the design logic of the subject facility is a plurality of rules expressing how equipment of the subject facility interacts with other equipment of the subject facility; and
    updating the design logic due to different locations of objects which were identified in the prior generated 3D CAD model of the subject facility and captured by generating an exception rule and implementing the exception rule as one of the plurality of rules to systematically knowledge capture the object and therefore update the practical implementation of the object;
    wherein applying the computer automated analysis further comprises identifying in the received laser scan data a shape of the equipment of the subject facility defined in a graphical object database and mapping the identified shape to a CAD modeling primitive within the graphical object database; and
    said identifying includes iteratively identifying sub-shapes in the received laser scan data, and mapping the identified sub-shapes to a CAD modeling primitive within the database until an identifiable shape is created; and
    rebuilding the 3D CAD model of the subject facility based on the computer automated analysis.

2. The method as claimed in claim 1 wherein the computer automated analysis is rules-based.

3. The method as claimed in claim 1 wherein applying the computer automated analysis comprises mapping laser scan data to CAD model objects forming the prior generated 3D CAD model, different CAD model objects representing different objects and equipment in the subject facility, said mapping being based on any one or more of shape, size and sequence of connection of objects and equipment in the facility.

4. The method as claimed in claim 1 wherein applying the computer automated analysis further comprises adding a new shape to the graphical object database, wherein the new shape includes a new sub-shape.

5. The method as claimed in claim 1 wherein the subject facility is any of a plant, a factory, or a refinery.

6. The method as claimed in claim 1 further comprising providing an output by displaying the rebuilt 3D CAD model.

7. A computer apparatus for CAD modeling comprising:
one or more processors configured to implement:
a source of laser scan data of various equipment within a subject facility, the various equipment having a use associated with the subject facility there being a prior generated 3D CAD model of the subject facility; and
a CAD re-engineering tool coupled to receive laser scan data from the source, the CAD re-engineering tool configured to:
apply a computer automated analysis to the received laser scan data to rebuild a 3D CAD model of the subject facility, the computer automated analysis utilizing design logic of the subject facility and design logic of the equipment of the subject facility, wherein the design logic of the subject facility is a plurality of rules expressing how equipment of the subject facility interacts with other equipment of the subject facility; and
update the design logic due to different locations of objects which were identified in the prior generated 3D CAD model of the subject facility and captured by generating an exception rule and implementing the exception rule as one of the plurality of rules to systematically knowledge capture the object and therefore update the practical implementation of the object;
the CAD re-engineering tool applying the computer automated analysis including identifying in the received laser scan data a shape of the subject facility defined in a graphical object database, and mapping the identified shape to a CAD modeling primitive within the graphical object database; and
the CAD re-engineering tool identifying in the received laser scan data the shape defined in the graphical object database by iteratively identifying sub-shapes in the received laser scan data, and mapping the identified sub-shapes to a CAD modeling primitive within the database until an identifiable shape is created; and
rebuild the 3D CAD model of the subject facility based on the computer automated analysis.

8. The computer apparatus as claimed in claim 7 wherein the computer automated analysis is rules-based.

9. The computer apparatus as claimed in claim 7 wherein the CAD re-engineering tool is further configured to map laser scan data to CAD model objects forming the 3D CAD model, different CAD model objects representing different objects and equipment in the subject facility, the mapping being based on any of shape, size and sequence of connection of objects and equipment in the facility.

10. The computer apparatus as claimed in claim 9 wherein the CAD re-engineering tool is further configured to add a new shape to the graphical object database, wherein the new shape includes a new sub-shape.

11. The computer apparatus as claimed in claim 7 wherein the subject facility is any of a plant, a factory or a refinery.

12. The computer apparatus as claimed in claim 7 wherein the CAD re-engineering tool displays the rebuilt 3D CAD model.

13. A computer program product for re-engineering CAD models comprising:
a non-transitory computer readable medium; and
the non-transitory computer readable medium embodying program code for:
receiving laser scan data of a subject facility, the subject facility having various equipment and having a previously generated 3D CAD model that have a use associated with the subject facility, the laser scan data including data of various equipment in the subject facility;
applying a computer automated analysis to the received laser scan data to rebuild the 3D CAD model of the subject facility, the computer automated analysis utilizing design logic of the subject facility and design logic of equipment of the subject facility, wherein the design logic of the subject facility is a plurality of rules expressing how equipment of the subject facility interacts with other equipment of the subject facility; and
updating the design logic due to different locations of objects which were identified in the prior generated 3D CAD model of the subject facility and captured by generating an exception rule and implementing the exception rule as one of the plurality of rules to systematically knowledge capture the object and therefore update the practical implementation of the object;
wherein applying the computer automated analysis comprises identifying in the received laser scan data a shape of the subject facility defined in a graphical object database, and mapping the identified shape to a CAD modeling primitive within the graphical object database; and
said identifying in the received laser scan data the shape defined in a graphical object database includes iteratively identifying sub-shapes in the received laser scan data, and mapping the identified sub-shapes to a CAD modeling primitive within the database until an identifiable shape is created; and
rebuilding the 3D CAD model of the subject facility based on the computer automated analysis.

14. The computer program product as claimed in claim 13 wherein the computer automated analysis is rules-based.

15. The computer program product as claimed in claim 13 wherein the computer automated analysis maps laser scan data to CAD model objects forming the 3D CAD model, different CAD model objects representing different objects and equipment in the subject facility, said mapping being based on any of shape, size and sequence of connection of objects and equipment in the facility.

16. The computer program product as claimed in claim 13 wherein the computer automated analysis further adds a new shape to the database, wherein the new shape includes a new sub-shape.

17. The computer program product as claimed in claim 13 wherein the subject facility is any of a plant, a factory, or a refinery.

* * * * *